(12) United States Patent
Hara et al.

(10) Patent No.: US 6,378,961 B1
(45) Date of Patent: Apr. 30, 2002

(54) BRAKE CONTROL APPARATUS

(75) Inventors: Kouichi Hara, Susono; Akiharu Kanagawa, Nagoya; Hironori Miyakoshi, Seto; Akira Hattori, Nagoya; Nobuyuki Furui, Nisshin, all of (JP)

(73) Assignees: Toyota Jidosha Kabushiki Kaisha, Toyota; Aisin Seiki Kabushiki Kaisha, Kariya, both of (JP)

( * ) Notice: Subject to any disclaimer, the term of this patent is extended or adjusted under 35 U.S.C. 154(b) by 0 days.

(21) Appl. No.: 09/383,989

(22) Filed: Aug. 26, 1999

(30) Foreign Application Priority Data

Oct. 6, 1998 (JP) ............................................. 10-284026

(51) Int. Cl.$^7$ ................................................ B60T 8/32
(52) U.S. Cl. ........................ 303/193; 303/191; 180/169; 342/71
(58) Field of Search ................................ 303/193, 191, 303/166, DIG. 3, DIG. 4; 180/167, 169; 342/71; 701/301

(56) References Cited

U.S. PATENT DOCUMENTS

| | | | | |
|---|---|---|---|---|
| 5,286,099 A | * | 2/1994 | Fujita et al. | ................ 303/125 |
| 5,447,363 A | * | 9/1995 | Fukamachi | ................ 303/125 |
| 5,574,644 A | * | 11/1996 | Butsuen et al. | ............ 180/169 |
| 5,931,547 A | * | 8/1999 | Lerner | ....................... 303/193 |
| 6,056,374 A | * | 5/2000 | Hiwatashi | ................. 303/193 |
| 6,058,347 A | * | 5/2000 | Yamamura et al. | ........ 303/193 |
| 6,070,682 A | * | 6/2000 | Isogai et al. | ................ 180/167 |

FOREIGN PATENT DOCUMENTS

| | | |
|---|---|---|
| DE | 43 28 304 A1 | 3/1994 |
| DE | 197 50 913 A1 | 5/1998 |
| DE | 196 54 769 A1 | 7/1998 |
| JP | A-6-1229 | 1/1994 |
| JP | A-9-11870 | 1/1997 |

* cited by examiner

Primary Examiner—Robert J Oberleitner
Assistant Examiner—Mariano Sy
(74) Attorney, Agent, or Firm—Oliff & Berridge PLC

(57) ABSTRACT

A brake control apparatus comprising a brake fluid pressure sensor for detecting the brake fluid pressure of the wheel cylinder for a braking system. That is, the brake fluid pressure sensor detects the condition of braking. The brake fluid pressure is controlled. The brake fluid pressure is increased based on a predetermined pressure increase gradient in the initial stage of the automatic braking, and is decreased based on a predetermined pressure decrease gradient in the latter stage of the automatic braking.

15 Claims, 5 Drawing Sheets

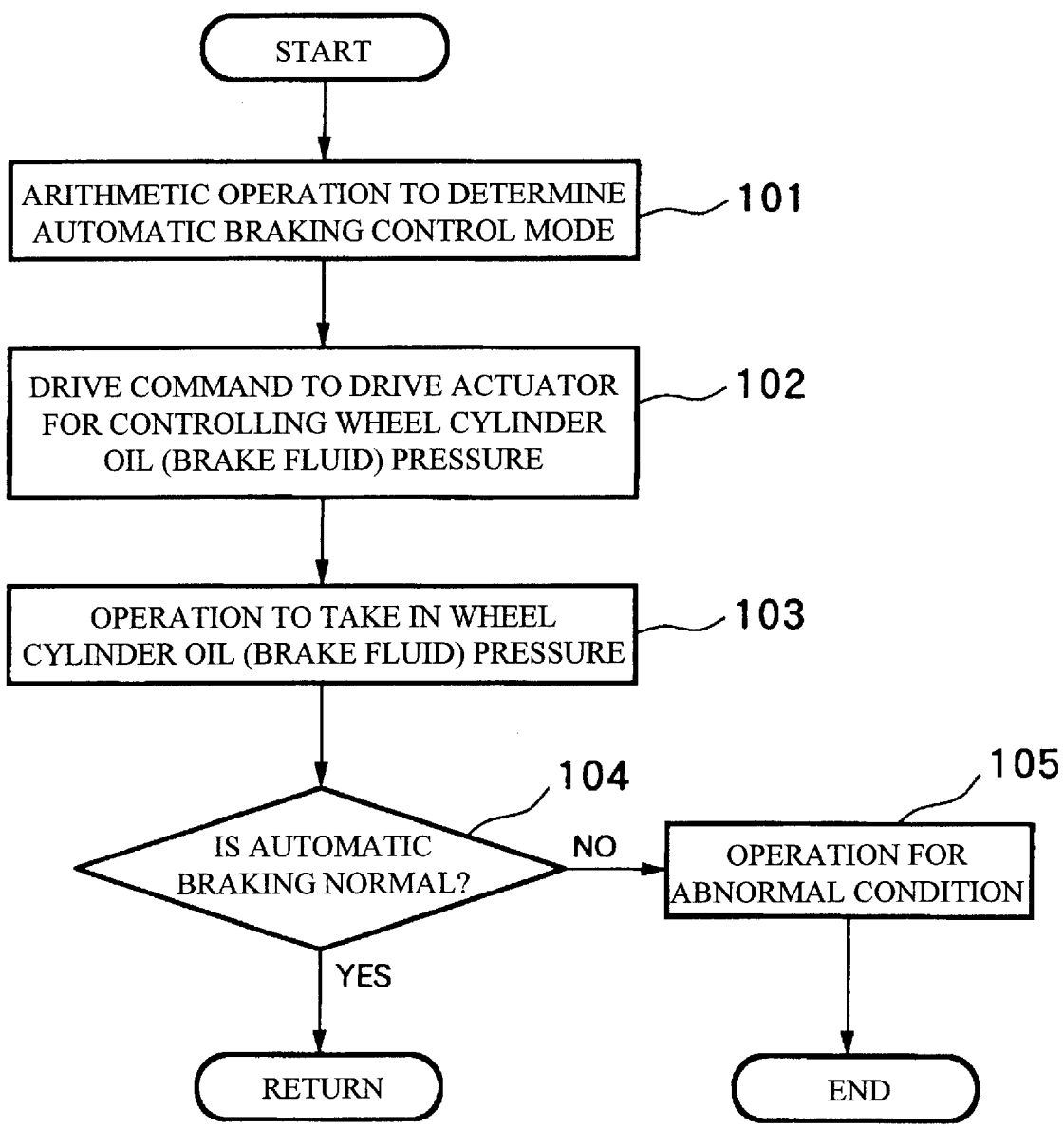

BRAKE CONTROL APPARATUS

BACKGROUND OF THE INVENTION

1. Field of the Invention

The present invention relates to a brake control apparatus for automatically braking a vehicle.

2. Related Background Art

An example of a known brake control apparatus for automatically braking the vehicle is one described in Japanese Laid-open Patent Application No. 9-11870. The control apparatus described in the application No. 9-11870 is arranged to detect a leading car or an obstacle ahead of the vehicle and automatically brake the vehicle when a collision is predicted, thereby assuring a following distance and avoiding the collision.

SUMMARY OF THE INVENTION

In the control apparatus for carrying out the automatic braking as described above, a braking operation during anomalies, e.g., canceling of the automatic braking, has to be carried out when the automatic braking condition is abnormal. Prior thereto, it is necessary to detect whether the automatic braking condition is normal or abnormal.

There is a need therefore for a brake control apparatus capable of carrying out the automatic braking surely and readily detecting whether the automatic braking condition is normal or abnormal.

According to the present invention, the brake control apparatus for a vehicle comprises: (A) a radar provided on the vehicle; (B) a braking system for the vehicle; (C) a sensor that detects a physical value, the physical value being changeable as a result of action by the braking system; and (D) an electronic control unit that automatically controls the braking system based on a signal from the radar, and that automatically controls the braking system so as to cause the physical value detected by the sensor to be a predetermined target physical value, the predetermined target physical value being variable during a braking period caused by the action of the braking system, the predetermined target physical value in an initial stage of the braking period increasing with time and the predetermined target physical value in a latter stage of the braking period decreasing with time. According to this apparatus, the apparatus can detect whether the automatic braking condition is normal or abnormal when comparing the detected physical value and the predetermined target physical value.

The sensor may be a pressure sensor for detecting the brake fluid pressure in a wheel cylinder of the vehicle.

Alternatively, the sensor may be a vehicle deceleration detection sensor for detecting a deceleration in the longitudinal motion of the vehicle.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 5 is a flowchart to show the automatic braking condition normal/abnormal determining routine by the brake control apparatus illustrated in FIG. 1.

DESCRIPTION OF THE PREFERRED EMBODIMENTS

The automatic braking means in the brake control apparatus of the invention is arranged to carry out automatic braking by controlling the oil (brake fluid) pressure of wheel cylinders of the vehicle. The braking condition is detected based on the brake fluid pressure of the wheel cylinders or based on the deceleration in the longitudinal direction of the vehicle. A first embodiment will be described first as an example for detecting whether the automatic braking condition is normal or abnormal based on the brake fluid pressure of the wheel cylinders. A second embodiment will be described next as an example for detecting whether the automatic braking condition is normal or abnormal based on the deceleration in the longitudinal direction of the vehicle.

Figure 1:
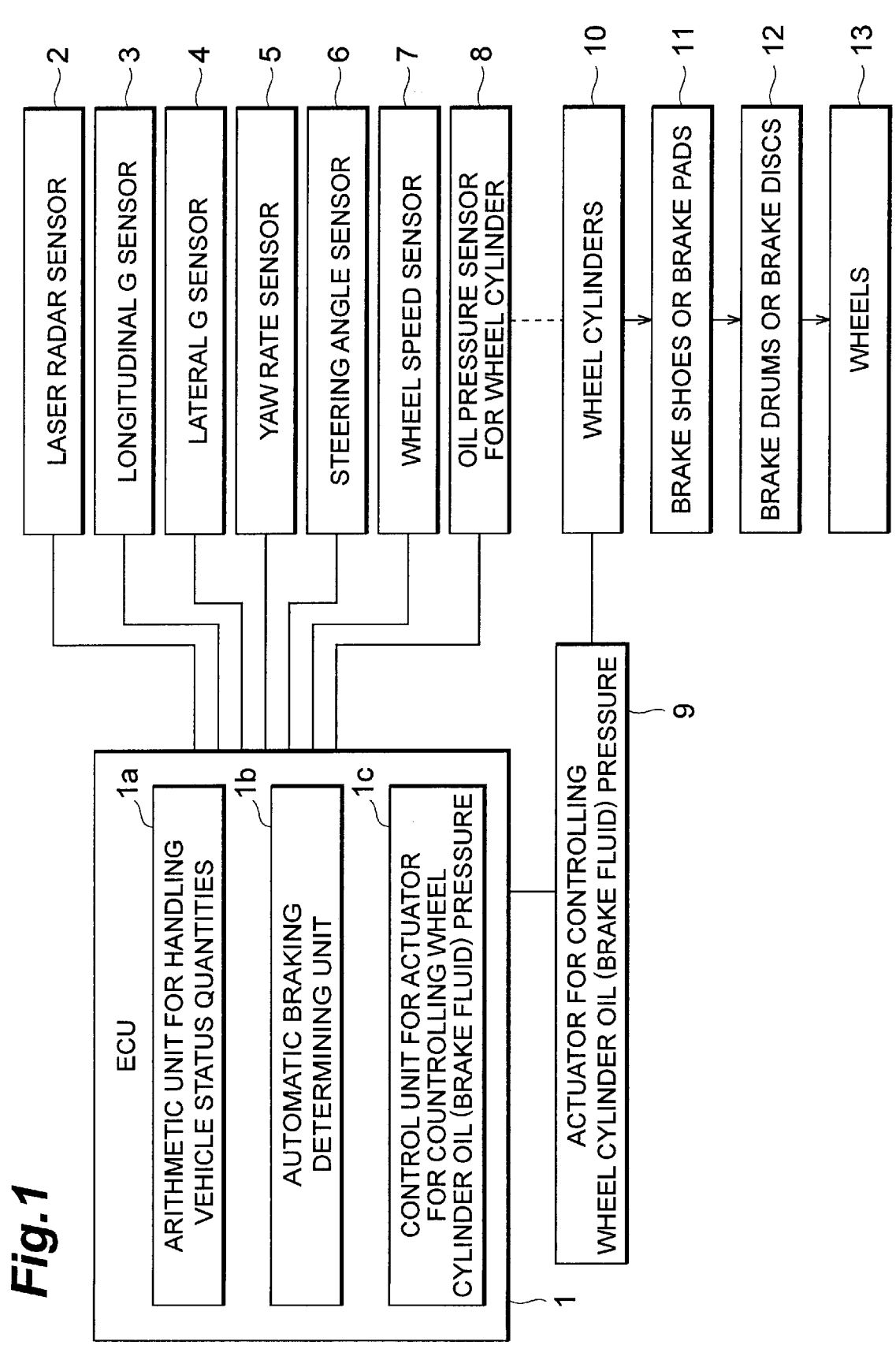
FIG. 1 is a schematic structural diagram to show an embodiment of the brake control apparatus.

The structure of the brake control apparatus as the first embodiment is illustrated in FIG. 1. The brake control apparatus of the present embodiment is adapted for the principal purpose of automatically braking the vehicle, particularly, in order to detect a leading car and maintain a constant following distance thereto. It is, however, noted that the apparatus can also be applied, either without any change or with some change, to urgent automatic braking for avoiding a collision.

As illustrated in FIG. 1, the brake control apparatus of the present embodiment has an ECU 1 comprised of a microcomputer. The ECU 1 has an arithmetic operation unit 1a for handling quantities representing a vehicle status, an automatic braking determining unit 1b, and a control unit 1c for controlling an actuator for control of the brake fluid pressure of the wheel cylinders, as functional blocks. The ECU 1 functions as the automatic braking necessity determining means and as the braking condition normal/abnormal determining means by cooperation with various sensors.

The various sensors for detecting a variety of vehicle status quantities are connected to the ECU 1 and these various sensors will be described below in order. A laser radar sensor 2, as the object detecting means for detecting an object ahead of the vehicle is mounted in the front part of the vehicle and is arranged to radiate a laser beam forward and detect presence/absence of an object like a leading car, a distance to the object, and a relative velocity to the object with reflected light of the laser beam. It is a matter of course that other detecting means including millimeter wave radars using millimeter waves instead of the laser beam, etc. can also be used as the object detecting means.

A longitudinal G sensor 3, which is the braking condition detecting means and vehicle deceleration detecting means (vehicle deceleration detecting sensor), is arranged to detect the deceleration (acceleration) in the longitudinal direction of the vehicle. A lateral G sensor 4 detects the deceleration (acceleration) in the lateral direction of the vehicle. A yaw rate sensor 5 detects a yaw rate of the vehicle. A steering angle sensor 6 detects a steering angle of the steering wheel. A wheel speed sensor 7 detects rotational speed of the wheel and the ECU 1 computes vehicle speed of the vehicle, based on the result of detection by the wheel speed sensor 7. The ECU 1 determines the operating status of the vehicle from the detection results by these various sensors.

A brake fluid pressure control actuator 9 is also connected to the ECU 1. The brake fluid pressure control actuator 9 controls the brake fluid pressure of the wheel cylinder 10 of each wheel. As the brake fluid pressure is increased in the wheel cylinders 10, brake shoes or brake pads 11 are urged against brake drums or brake disks 12, whereby rotation of the wheels 13 is suppressed by frictional force, so as to brake the vehicle. The wheel cylinder 10 is equipped with a brake fluid pressure sensor 8 for detecting the brake fluid pressure thereof. The brake fluid pressure sensor 8 is also connected to the ECU 1.

Figure 2:
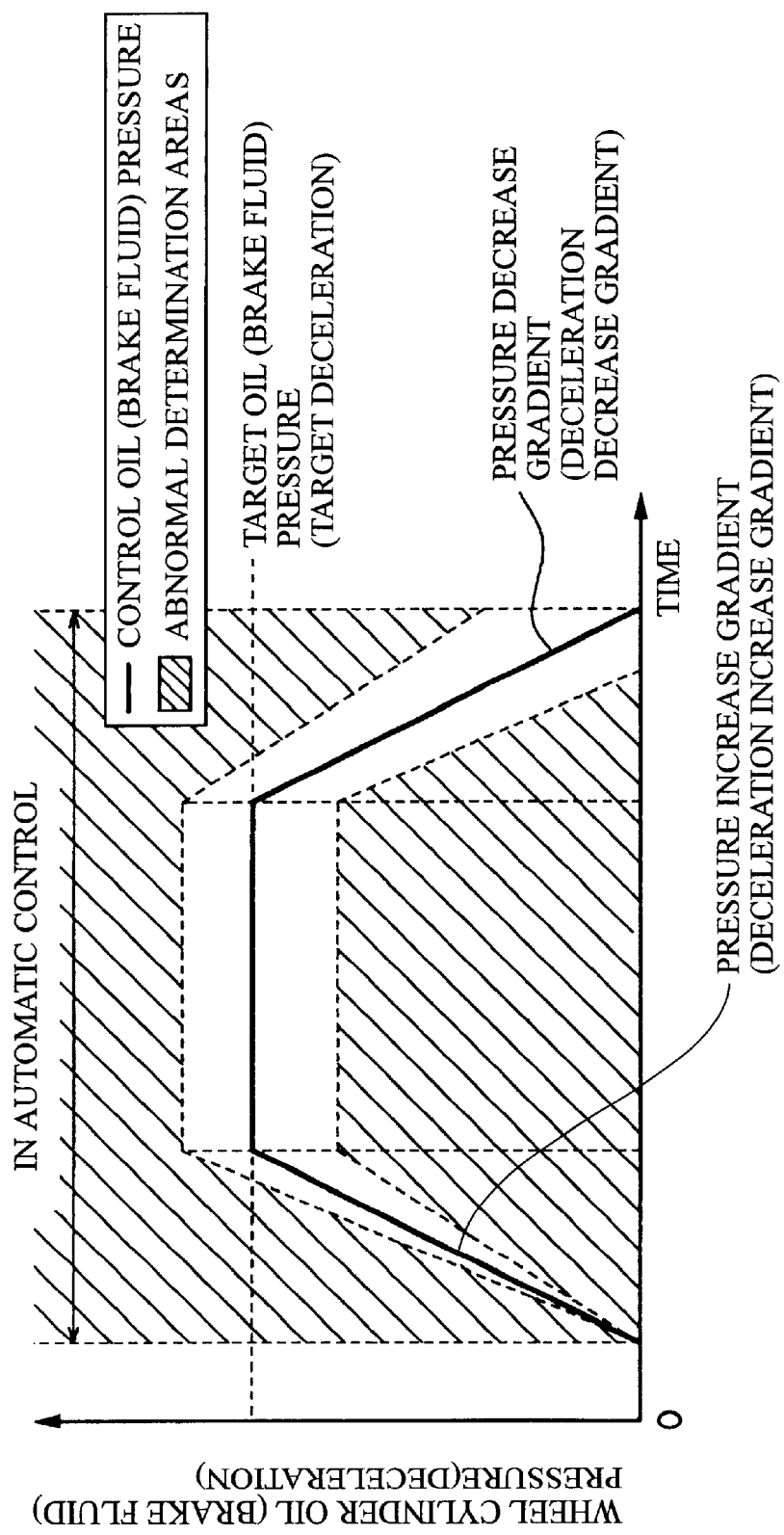
FIG. 2 a graph to show the relationship between time and wheel cylinder brake fluid pressure (deceleration in the longitudinal direction) in the case of the brake control apparatus illustrated in FIG. 1.

During the automatic braking by the brake control apparatus in the above-stated structure of the present embodiment, as illustrated in FIG. 2, the brake fluid pressure of the wheel cylinders 10 is controlled according to control brake fluid pressures having a predetermined pressure increase gradient in the initial stage of the automatic braking (in a pressure increase mode). In the latter stage of the automatic braking the brake fluid pressure of the wheel cylinders 10 is controlled according to control brake fluid pressures having a predetermined pressure decrease gradient (in a pressure decrease mode). In the example illustrated in FIG. 2, a certain target brake fluid pressure is further determined prior to the start of the automatic braking and the brake fluid pressure of the wheel cylinders is retained at this target brake fluid pressure in the middle stage of the automatic braking (in a retention mode).

Each of the pressure increase gradient and the pressure decrease gradient does not have to be limited to only one, but it is also allowed to prepare some gradients for each mode preliminarily and determine which gradient should be used, prior to the start of the automatic braking. For example, two or three types of pressure increase gradients are prepared and an optimum gradient is selected out of the two or three types of pressure increase gradients according to the target brake fluid pressure computed from the detection results of the laser radar sensor 2 etc. In this case, the vehicle can be braked quickly and the braking can be very smooth, if the apparatus is arranged to select a steep pressure increase gradient for high target brake fluid pressures and to select gentle pressure increase and decrease gradients for low target brake fluid pressures.

Figure 3:
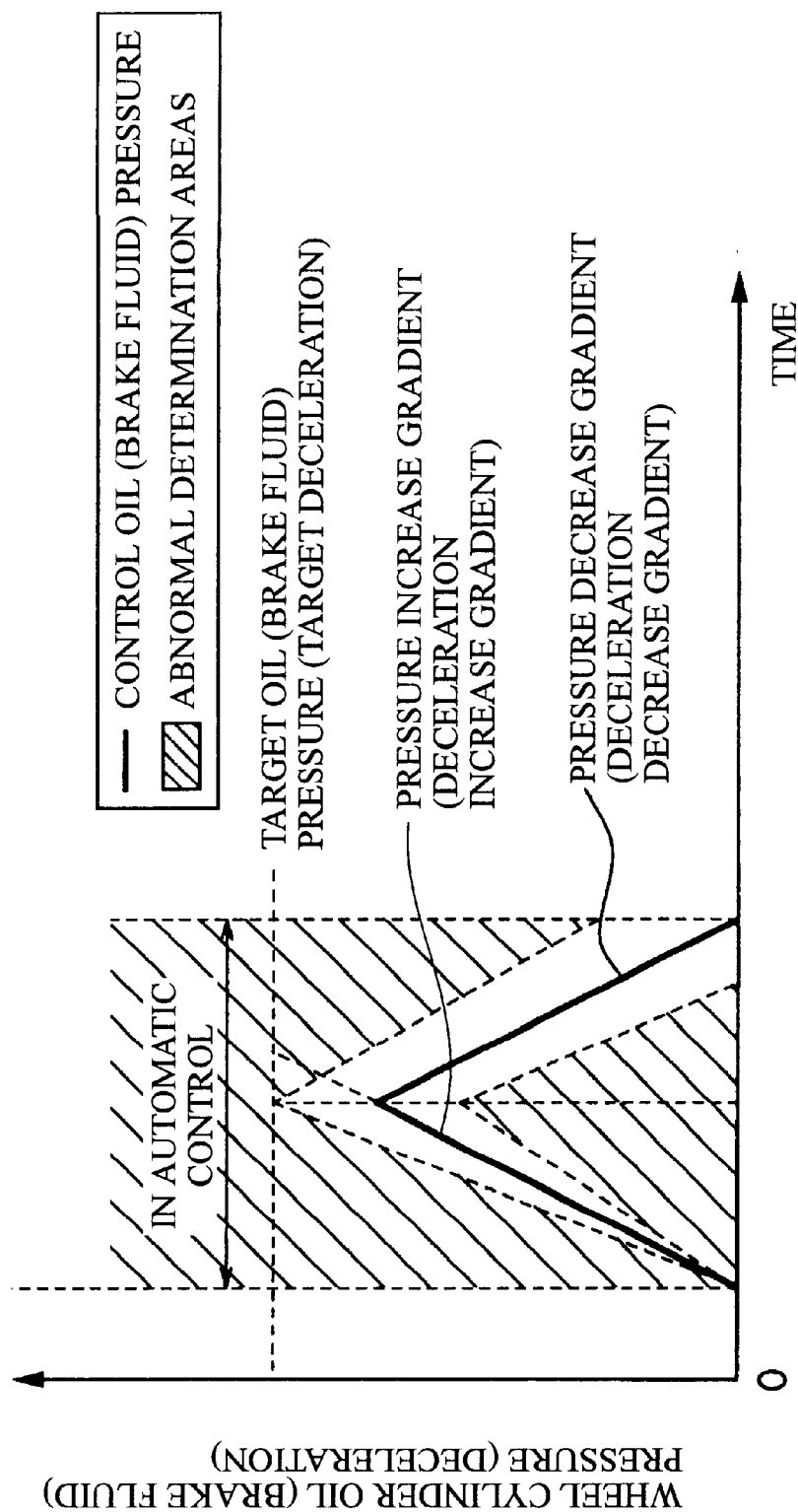
FIG. 3 another graph to show the relationship between time and wheel cylinder brake fluid pressure (deceleration in the longitudinal direction) in the case of the brake control apparatus illustrated in FIG. 1.

In certain cases, for example, where a release command of the automatic braking is issued during the increase of the brake fluid pressure of the wheel cylinders under the automatic braking, the operation can move into the pressure decrease mode before going into the retention mode for retaining the constant brake fluid pressure of the wheel cylinders in the middle stage of the automatic braking, as illustrated in FIG. 3.

The ECU 1 controls the brake fluid pressure control actuator 9 so that the brake fluid pressure of the wheel cylinders follows the control brake fluid pressures increased or decreased along the pressure increase gradient or the pressure decrease gradient preliminarily determined. The actual brake fluid pressure of the wheel cylinders is detected in succession by the brake fluid pressure sensor 8 to be taken into the ECU 1. In the present embodiment, whether the automatic braking condition is normal or abnormal is determined based on the brake fluid pressure of the wheel cylinders detected by the brake fluid pressure sensor 8 during the automatic braking.

In addition to the pressure increase gradient preliminarily determined, a permissible range is also determined for making a decision that the automatic braking based on this pressure increase gradient is normal. If the wheel cylinder brake fluid pressure detected by the brake fluid pressure sensor 8 during the automatic braking is out of this range it will be determined that the automatic braking condition is abnormal. In this example, for determining the permissible range for making the decision that the automatic braking is normal with respect to the pressure increase gradient, a steeper boundary and a gentler boundary are set for the pressure increase gradient. The same can also be applied to the pressure decrease gradient, but start points of gradients, which define boundaries of the permissible range for making the decision that the automatic braking is normal, are made continuous from the permissible range in the middle stage of the automatic braking.

When the automatic braking is carried out based on the predetermined pressure increase gradient and pressure decrease gradient in this way, a decision on whether the automatic braking condition is normal or abnormal can be made accurately and readily by simply comparing the actual wheel cylinder brake fluid pressure with these pressure increase gradient and pressure decrease gradient. In this case, if the predetermined ranges based on the pressure increase gradient and the pressure decrease gradient are used as the permissible ranges for making the decision that the automatic braking is normal, the decision on whether the automatic braking condition is normal or abnormal can be made more accurately and readily by simply checking whether the actual wheel cylinder brake fluid pressure is within the predetermined ranges.

In the middle stage of the automatic braking the control brake fluid pressure is the target brake fluid pressure of a constant value and the wheel cylinder brake fluid pressure is controlled so as to be retained at this target brake fluid pressure. Against this target brake fluid pressure, a range within a certain deviation is defined as the permissible range for making the decision that the automatic braking is normal, and outside this range, it is determined that the automatic braking condition is abnormal. When the target value of the wheel cylinder brake fluid pressure is constant in the middle stage of the automatic braking in this way, the decision on whether the automatic braking condition is normal or abnormal can be made accurately and readily by simply determining whether the wheel cylinder brake fluid pressure detected by the brake fluid pressure sensor 8 during the automatic braking is within the predetermined range based on this constant target brake fluid pressure. These decisions on whether the automatic braking condition is normal or abnormal are made by the ECU 1, based on the detection result of the brake fluid pressure sensor 8.

Figure 4:
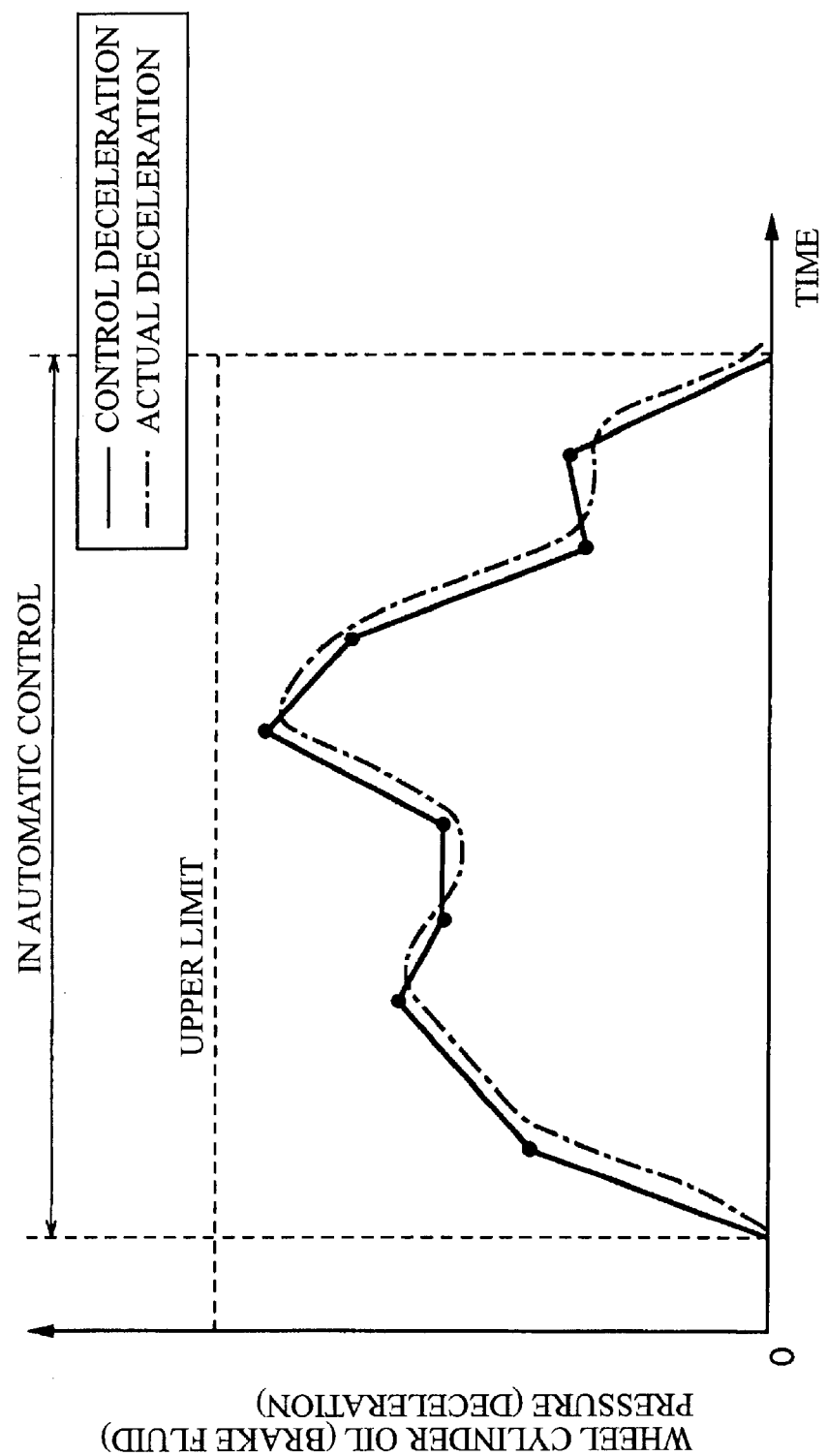
FIG. 4 is a graph to show the relationship between time and wheel cylinder brake fluid pressure (deceleration in the longitudinal direction) in the cases not employing the brake control apparatus.

In contrast with it, if the pressure increase gradient and pressure decrease gradient were not determined preliminarily, control decelerations would be changed at random during the automatic braking as illustrated in FIG. 4 and as a consequence, actual decelerations in the longitudinal direction of the vehicle would also vary with time so as to follow the control decelerations. In such cases, it is difficult to determine whether a change in the actual deceleration in the longitudinal direction of the vehicle results from a normal control or from an abnormal control (for example, an abnormal control due to a failure or the like of the brake fluid pressure control actuator 9). It is also conceivable to employ a method for setting an upper limit and making a decision of an anomaly when the actual deceleration in the longitudinal direction of the vehicle exceeds the upper limit, but this method is unable to detect an abnormal control in the level below the upper limit. It is also conceivable to make the decision, based on successive comparison between the actual deceleration in the longitudinal direction of the vehicle and control decelerations. However, the control decelerations and actual decelerations in the longitudinal direction of the vehicle vary in many ways during the automatic braking, which makes the determination conditions complicated. This makes the determination slow or difficult.

Next described is a process for carrying out the automatic braking and determining whether this automatic braking condition is normal, using the brake control apparatus of the structure described above.

The detection results of the various sensors described above are taken into the ECU 1 in succession and a program stored in the ECU 1 determines whether the automatic braking should be activated, based on the various vehicle status quantities, every constant time (for example, every several milliseconds). A situation where the automatic braking is necessary occurs, for example, during an operation of an auto-cruise system to carry out constant-speed running of the vehicle at a set speed. The laser radar sensor 2 detects a leading car running at a lower speed than that of the vehicle with the set speed. The apparatus can be so arranged that this determination on whether the automatic braking is necessary or not is carried out only when the vehicle with the set speed status meets certain conditions or when a switch capable of being controlled by a driver is turned on.

Once the ECU 1 determines that the automatic braking is necessary, it computes various control values associated with the automatic braking, based on the various vehicle status quantities taken from the various sensors described above into the ECU 1. The computation of the various control values involves the determination of the target brake fluid pressure, the selection/determination of the pressure increase gradient and pressure decrease gradient (if a plurality of pressure increase gradients and pressure decrease gradient are prepared), etc. as described above, and a determination of the control brake fluid pressure as a control target of the wheel cylinder brake fluid pressure during the automatic braking. The automatic braking is started based on the various control values thus computed.

During the automatic braking, whether the automatic braking condition is normal or abnormal is determined according to an automatic braking condition normal/abnormal determining routine illustrated in FIG. 5. This routine is carried out repeatedly every constant time (for example, every several milliseconds) during the automatic braking by the program stored in the ECU 1.

First, an arithmetic operation to determine which control mode (the pressure increase mode, the retention mode, or the pressure decrease mode) the automatic braking is in at present is carried out based on the various vehicle status quantities detected by the various sensors (step 101). The control mode is the pressure increase mode immediately after the automatic braking, and the arithmetic operation is carried out to determine in which control mode the automatic braking should be carried out where this routine is carried out repeatedly after the start of the automatic braking.

After step 101, a drive command for driving the brake fluid pressure control actuator 9 according to the control mode is sent from the ECU 1 to the brake fluid pressure control actuator 9 (step 102). The brake fluid pressure control actuator 9 controls the brake fluid pressure of the wheel cylinders 10, based on the command from the ECU 1, so as to exert braking force on the vehicle.

When the control mode is the pressure increase mode, the drive command is one to increase the wheel cylinder brake fluid pressure at a fixed rate according to the pressure increase gradient. When the control mode is the retention mode, the drive command is one to retain the wheel cylinder brake fluid pressure. When the control mode is the pressure decrease mode, the drive command is one to decrease the wheel cylinder brake fluid pressure at a fixed rate according to the pressure decrease gradient.

Then the actual wheel cylinder brake fluid pressure is taken from the brake fluid pressure sensor 8 into the ECU 1 in order to detect the automatic braking condition (step 103). The wheel sensor brake fluid pressure taken into the ECU 1 is compared with the above-described control brake fluid pressures to determine whether the automatic braking condition is normal (step 104). The determination is made based on whether the actual wheel cylinder brake fluid pressure detected by the brake fluid pressure sensor 8 is within the predetermined range based on the control brake fluid pressures, as stated previously.

When it is determined in step 104 that the automatic braking condition is normal, the operations from step 101 to this step are carried out again after a lapse of the fixed time. When it is determined in step 104 that the automatic braking condition is abnormal, an operation for abnormal condition is carried out (step 105). The operation for abnormal condition is an operation to release the control of the wheel cylinder brake fluid pressure effected by the automatic braking and to call driver's attention by activating an alarm buzzer or by lighting or blinking of an alarm lamp in the instrument panel, for example. After the execution of the operation for abnormal condition, this routine is terminated.

Next, the second embodiment of the brake control apparatus will be described.

The brake control apparatus of the present embodiment is different from the control apparatus of the first embodiment described above. The control apparatus of the first embodiment detects the automatic braking condition by the wheel cylinder brake fluid pressure and determines whether the automatic braking condition is normal or abnormal based on this wheel cylinder brake fluid pressure. On the other hand, the control apparatus of the second embodiment detects the automatic braking condition by deceleration of the vehicle and determines whether the automatic braking condition is normal or abnormal based on this deceleration.

The brake control apparatus of the present embodiment has the same structure as the above-stated apparatus illustrated in FIG. 1.

During the automatic braking carried out by the brake control apparatus of the present embodiment, control is made in the initial stage of the automatic braking so that the deceleration in the longitudinal direction of the vehicle follows control decelerations having a deceleration increase gradient preliminarily determined, as illustrated in FIG. 2 (in a deceleration increase mode). In the latter stage of the automatic braking, control is made so that the deceleration in the longitudinal direction of the vehicle follows control decelerations having a deceleration decrease gradient preliminarily determined (in a deceleration decrease mode).

Further, a certain target deceleration is determined prior to the start of the automatic braking and the deceleration in the longitudinal direction of the vehicle is retained at this target deceleration in the middle stage of the automatic braking (in a retention mode).

The deceleration increase gradient or the deceleration decrease gradient does not have to be limited to only one, which is the same as in the case of the pressure increase gradient and the pressure decrease gradient in the first embodiment described previously. There is the possibility that the retention mode described above is absent during the automatic braking, which is also the same as in the case of the first embodiment described previously.

The ECU 1 controls the brake fluid pressure control actuator 9 so that the deceleration in the longitudinal direction of the vehicle follows the control decelerations increased or decreased along the deceleration increase gradient or the deceleration decrease gradient preliminarily determined. Then the actual deceleration in the longitudinal direction of the vehicle is detected in succession by the longitudinal G sensor 4 to be taken into the ECU 1. In the present embodiment whether the automatic braking condition is normal or abnormal is determined, based on the deceleration in the longitudinal direction of the vehicle, which is detected by the longitudinal G sensor 4 during the automatic braking.

This determination is similar to the determination based on the wheel cylinder brake fluid pressure in the first embodiment described above. Specifically, the permissible range for making the decision that the automatic braking is normal is determined based on the deceleration increase gradient, and the decision that the automatic braking condition is abnormal is made when the deceleration in the longitudinal direction of the vehicle, detected by the longitudinal G sensor 3 during the automatic braking, is off this range. The same can also be applied to the deceleration decrease gradient. When the automatic braking is carried out based on the predetermined deceleration increase gradient or deceleration decrease gradient in this way, the decision on whether the automatic braking condition is normal or abnormal can be made accurately and readily, which is also the same as in the case of the first embodiment described above.

In the middle stage of the automatic braking, the control deceleration is the target deceleration of a constant value and control is made so that the deceleration in the longitudinal direction of the vehicle is retained at this target deceleration. The permissible range for making the decision that the automatic braking is normal is also determined for this target deceleration, and when the deceleration is out of the permissible range, it is determined that the automatic braking condition is abnormal. This permits the decision on whether the automatic braking condition is normal or abnormal to be made accurately and readily, which is also the same as in the case of the first embodiment described above. These decisions on whether the automatic braking condition is normal or abnormal are made by the ECU 1, based on the value detected by the longitudinal G sensor 3.

The process for carrying out the automatic braking and determining whether this automatic braking condition is normal or not by the brake control apparatus of the present embodiment is similar to that in the first embodiment, and, therefore, only differences will be described below while omitting the detailed description of the like portions.

In the flowchart of FIG. 5, step 101 is different in that the control mode is either the deceleration increase mode, the deceleration decrease mode, or the retention mode, but the present embodiment is the same as the first embodiment in that in step 102 the drive command for the brake fluid pressure control actuator 9 is sent from the ECU 1, based on the control mode. When the control mode is the deceleration increase mode, the drive command is one to increase the deceleration in the longitudinal direction of the vehicle at a constant rate according to the deceleration increase gradient. When the control mode is the retention mode, the drive command is one to retain the deceleration in the longitudinal direction of the vehicle. When the control mode is the deceleration decrease mode, the drive command is one to decrease the deceleration in the longitudinal direction of the vehicle at a constant rate according to the deceleration decrease gradient.

In step 103 the actual deceleration in the longitudinal direction of the vehicle is taken from the longitudinal G sensor 3 into the ECU 1 in order to detect the automatic braking condition and in step 104 the deceleration in the longitudinal direction of the vehicle, thus taken, is compared with the aforementioned control decelerations to determine whether the automatic braking condition is normal.

The brake control apparatus of the present invention is not limited to the embodiments described above. For example, the above embodiments were arranged to select the optimum gradients out of the predetermined pressure increase gradients (deceleration increase gradients) and pressure decrease gradients (deceleration decrease gradients) and determine the target brake fluid pressure (target deceleration) prior to the start of the automatic braking and then to carry out the automatic braking. However, the automatic braking may also be carried out as follows. The following describes an example of the automatic braking and the determination on whether it is normal or abnormal, based on the wheel cylinder brake fluid pressure, but those based on the deceleration in the longitudinal direction of the vehicle can also be carried out in a similar fashion.

An optimum gradient is selected out of the pressure increase gradients preliminarily determined, based on the vehicle status at the start of the automatic braking. Based on this pressure increase gradient, the brake fluid pressure of the wheel cylinders 10 is increased to start the automatic braking. While the vehicle status quantities are monitored in succession, it is determined in succession whether the wheel cylinder brake fluid pressure should be increased further. The wheel cylinder brake fluid pressure is increased at a constant rate according to the pressure increase gradient as long as the status necessitating the increase continues (in the pressure increase mode).

When it is determined during the successive monitoring of the vehicle status quantities that the wheel cylinder brake fluid pressure does not have to be increased further, the wheel cylinder brake fluid pressure is retained at a constant value as it is (in the retention mode). When it is further determined during the successive monitoring of the vehicle status quantities that the automatic braking becomes unnecessary, an optimum gradient is selected out of the pressure decrease gradients preliminarily determined and the brake fluid pressure of the wheel cylinders 10 is decreased at a constant rate according to this pressure decrease gradient.

Since this also permits the wheel cylinder brake fluid pressure to be controlled according to the pressure increase gradient and pressure decrease gradient preliminarily determined, whether the automatic braking is normal or abnormal can be determined accurately and readily. This is also the case in the automatic braking based on the deceleration in the longitudinal direction of the vehicle. The target brake fluid pressure (target deceleration) in the retention mode may also be set as a fixed value that is applicable to any cases.

In the embodiments described previously, the regions between the steeper boundary and the gentler boundary for the pressure increase gradient (deceleration increase gradient) and the pressure decrease gradient (deceleration decrease gradient) are set as the permissible ranges for making the decision that the automatic braking is normal. These ranges, however, can be replaced by ranges falling within a certain deviation with respect to the pressure increase gradient (deceleration increase gradient) and the pressure decrease gradient (deceleration decrease gradient). In this case, the gradients as boundaries of the permissible ranges for determining that the automatic braking is normal are parallel to the pressure increase gradient (deceleration increase gradient) or the pressure decrease gradient (deceleration decrease gradient).

In the embodiments described above, as illustrated in FIG. 2, the target brake fluid pressure (target deceleration) is determined prior to the start of the automatic braking, the wheel cylinder brake fluid pressure (the deceleration in the longitudinal direction of the vehicle) is increased according to the pressure increase gradient (deceleration increase gradient), and after arrival at the target brake fluid pressure (target deceleration), the control is moved into the retention mode for retaining the target brake fluid pressure (target deceleration) (there are also some cases in which the automatic braking is released before the retention mode as illustrated in FIG. 3). The control can also be carried out without provision of such a retention mode, however. For example, the automatic braking can also be carried out in such a manner that the control is transferred into the pressure decrease mode (deceleration decrease mode) immediately after the pressure increase mode (deceleration increase mode), so as to obtain desired braking force by the overall operation in the both modes.

The embodiments described above used the longitudinal G sensor 3 as the vehicle deceleration detecting means for detecting the deceleration in the longitudinal direction of the vehicle, but the deceleration of the vehicle can also be detected by other mechanisms than the G sensor. For example, the apparatus may also be arranged to compute the vehicle speed from the detection result of the wheel speed sensor 7 and obtain the deceleration of the vehicle from the vehicle speed thus calculated.

The brake control apparatus is arranged to carry out the automatic braking so that the wheel cylinder brake fluid pressure (the deceleration in the longitudinal direction of the vehicle) follows the control brake fluid pressures (control decelerations) having the pressure increase gradient (deceleration increase gradient) and the pressure decrease gradient (deceleration decrease gradient) preliminarily determined and to compare the actual wheel cylinder brake fluid pressure (the deceleration in the longitudinal direction of the vehicle) with the control brake fluid pressures (control decelerations) to detect whether the automatic braking condition is normal or abnormal. Since the pressure increase gradient (deceleration increase gradient) and the pressure decrease gradient (deceleration decrease gradient) are determined preliminarily, an abnormal state of the automatic braking condition can be detected surely and readily.

As stated above, the present brake control apparatus for a vehicle comprises: (A) a radar 2 provided on the vehicle; (B) a braking system 9, 10, 11, 12, 13 for the vehicle; (C) a sensor 8, 3 that detects a physical value, the physical value being changeable as a result of action by the braking system 9, 10, 11, 12, 13; and (D) an electronic control unit 1 that automatically controls the braking system 9, 10, 11, 12, 13 based on a signal from the radar 2, and that automatically controls the braking system 9, 10, 11, 12, 13 so as to cause the physical value detected by the sensor 8,3 to be a predetermined target physical value, the predetermined target physical value being variable during a braking period caused by the action of the braking system 9, 10, 11, 12, 13, the predetermined target physical value in an initial stage of the braking period increasing with time and the predetermined target physical value in a latter stage of the braking period decreasing with time. According to this apparatus, the apparatus can detect whether the automatic braking condition is normal or abnormal when comparing the detected physical value and the predetermined target physical value.

This sensor may be a pressure sensor 8 for detecting the brake fluid pressure in a wheel cylinder 10 of the vehicle.

This sensor may be a vehicle deceleration detection sensor 3 for detecting a deceleration in the longitudinal motion of the vehicle.

Further, the brake control apparatus comprises: object detecting means 2 for detecting an object ahead of a vehicle, automatic braking necessity determining means 1 for determining whether automatic braking is necessary, based on a result of detection by the object detecting means 2, automatic braking means 1, 9 for automatically braking the vehicle by controlling a brake fluid pressure of a wheel cylinder 10 of the vehicle, based on a result of determination by the automatic braking necessity determining means 1, and braking condition detecting means 8 for detecting a condition of braking carried out by the automatic braking means 1, 9, wherein the braking condition detecting means 8 is a brake fluid pressure sensor 8 for detecting the brake fluid pressure of the wheel cylinder 10, and wherein the automatic braking means 1,9 automatically brakes the vehicle so that the brake fluid pressure of the wheel cylinder 10 is increased according to a predetermined pressure increase gradient in the initial stage of the automatic braking and is decreased according to a predetermined pressure decrease gradient in the latter stage of the automatic braking.

According to the above apparatus, the brake fluid pressure of the wheel cylinder is increased according to the predetermined pressure increase gradient in the initial stage of the automatic braking and is decreased according to the predetermined pressure decrease gradient in the latter stage of the automatic braking. When the brake fluid pressure of the wheel cylinder detected by the brake fluid pressure sensor as a braking condition detecting means is compared with the pressure increase gradient and the pressure decrease gradient as control targets in order to determine whether the automatic braking condition is abnormal, the comparison can be carried out readily between the wheel cylinder brake fluid pressure and the pressure increase gradient/pressure decrease gradient, because the pressure increase gradient and pressure decrease gradient are preliminarily determined. As a consequence, an abnormal state of the automatic braking condition can be detected surely and readily.

The apparatus may comprise braking condition normal/abnormal determining means for determining whether the automatic braking condition is normal or abnormal, based on a result of detection by said braking condition detecting means, wherein when in the initial stage of the automatic braking the brake fluid pressure of the wheel cylinder detected by the braking condition detecting means departs from a predetermined range based on the pressure increase gradient, the braking condition normal/abnormal determining means determines that the automatic braking condition is abnormal.

According to this apparatus, the predetermined range is determined based on the predetermined pressure increase gradient, and whether the automatic braking condition is normal or abnormal in the initial stage of the automatic braking can be determined by simply determining whether the result of detection by the brake fluid pressure sensor as the braking condition detecting means is within this predetermined range. Namely, an abnormal state of the automatic braking condition can be detected more surely and readily. Since this determination can be made very quickly, no delay occurs in the determination.

The above apparatus may comprise braking condition normal/abnormal determining means for determining whether the automatic braking condition is normal or abnormal, based on a result of detection by said braking condition detecting means, wherein when in the latter stage of the automatic braking the brake fluid pressure of the wheel cylinder detected by the braking condition detecting means departs from a predetermined range based on the pressure decrease gradient, the braking condition normal/abnormal determining means determines that the automatic braking condition is abnormal.

According to this apparatus, the predetermined range is determined based on the predetermined pressure decrease gradient, and whether the automatic braking condition is normal or abnormal in the latter stage of the automatic braking can be determined by simply determining whether the result of detection by the brake fluid pressure sensor as the braking condition detecting means is within this predetermined range. Namely, an abnormal state of the automatic braking condition can be detected more surely and readily. Since the determination can be made very quickly, no delay occurs in the determination.

In the middle stage of the automatic braking the automatic braking means may automatically brake the vehicle so that the brake fluid pressure of the wheel cylinder is retained at a constant target brake fluid pressure.

According to this apparatus, such a control as to retain the brake fluid pressure of the wheel cylinder at the constant target brake fluid pressure is carried out in the middle stage of the automatic braking. When the brake fluid pressure of the wheel cylinder detected by the brake fluid pressure sensor as the braking condition detecting means is compared with the target brake fluid pressure being a control target, the comparison can be carried out readily between this target brake fluid pressure and the brake fluid pressure of the wheel cylinder, because the target brake fluid pressure does not vary in the middle stage of the automatic braking. As a consequence, an abnormal state of the automatic braking condition can be detected surely and readily. By carrying out such a control as to retain the brake fluid pressure of the wheel cylinder at the constant target brake fluid pressure in the middle stage of the,automatic braking as described above, the braking force can be raised in an early stage (namely, the pressure increase gradient can be made steep) and after some braking force is obtained, this braking force can be retained. This can improve the braking response more.

The apparatus may comprise braking condition normal/abnormal determining means for determining whether the automatic braking condition is normal or abnormal, based on a result of detection by said braking condition detecting means, wherein when in the middle stage of the braking the brake fluid pressure of the wheel cylinder detected by the braking condition detecting means departs from a predetermined range based on the target brake fluid pressure, the braking condition normal/abnormal determining means determines that the automatic braking condition is abnormal.

According to this apparatus, the predetermined range is determined based on the target brake fluid pressure of the constant value and whether the automatic braking condition is normal or abnormal in the middle stage of the automatic braking can be determined by simply determining whether the result of detection by the brake fluid pressure sensor as the braking condition detecting means is within this predetermined range. Namely, an abnormal state of the automatic braking condition can be detected more surely and readily. Since the determination can be made very quickly, no delay occurs in the determination.

The apparatus may detect automatic braking condition by deceleration of vehicle and determines whether the automatic braking condition is normal or abnormal based on this deceleration instead.

That is, this brake control apparatus comprises object detecting means 2 for detecting an object ahead of a vehicle, automatic braking necessity determining means 1 for determining whether automatic braking is necessary, based on a result of detection by the object detecting means 2, automatic braking means 1, 9 for automatically braking the vehicle by controlling a brake fluid pressure of a wheel cylinder 10 of the vehicle, based on a result of determination by the automatic braking necessity determining means 1, and braking condition detecting means 3 for detecting a condition of braking carried out by the automatic braking means 1, 9, wherein the braking condition detecting means is vehicle deceleration detecting means 3 for detecting a deceleration in the longitudinal direction of the vehicle, and wherein the automatic braking means 1, 9 automatically brakes the vehicle so that the deceleration in the longitudinal direction of the vehicle increases according to a predetermined deceleration increase gradient in the initial stage of the automatic braking and decreases according to a predetermined deceleration decrease gradient in the latter stage of the automatic braking.

According to this apparatus, the deceleration in the longitudinal direction of the vehicle is increased so as to follow the predetermined deceleration increase gradient in the initial stage of the automatic braking and is decreased so as to follow the predetermined deceleration decrease gradient in the latter stage of the automatic braking. When the deceleration in the longitudinal direction of the vehicle detected by the vehicle deceleration detecting means as the braking condition detecting means is compared with the deceleration increase gradient and the deceleration decrease gradient as control targets in order to determine whether the automatic braking condition is abnormal, the comparison can be carried out readily between the deceleration in the longitudinal direction of the vehicle and the deceleration increase gradient/deceleration decrease gradient, because the deceleration increase gradient and deceleration decrease gradient are preliminarily determined. As a consequence, an abnormal state of the automatic braking condition can be detected surely and readily.

The apparatus may comprise braking condition normal/abnormal determining means for determining whether the automatic braking condition is normal or abnormal, based on a result of detection by said braking condition detecting means, wherein when in the initial stage of the automatic braking the deceleration detected by the braking condition detecting means departs from a predetermined range based on the deceleration increase gradient, the braking condition normal/abnormal determining means determines that the automatic braking condition is abnormal.

According to this apparatus, the predetermined range is determined based on the predetermined deceleration increase gradient, and whether the automatic braking condition is normal or abnormal in the initial stage of the automatic braking can be determined by simply determining whether the result of detection by the vehicle deceleration detecting means as the braking condition detecting means is within this predetermined range. Namely, an abnormal state of the automatic braking condition can be detected more surely and readily. Since this determination can be made very quickly, no delay occurs in the determination.

The apparatus may comprise braking condition normal/abnormal determining means for determining whether the automatic braking condition is normal or abnormal, based on a result of detection by said braking condition detecting means, wherein when in the latter stage of the automatic braking the deceleration detected by the braking condition detecting means departs from a predetermined range based on the deceleration decrease gradient, the braking condition normal/abnormal determining means determines that the automatic braking condition is abnormal.

According to this apparatus, the predetermined range is determined based on the predetermined deceleration decrease gradient, and whether the automatic braking condition is normal or abnormal in the latter stage of the automatic braking can be determined by simply determining whether the result of detection by the vehicle deceleration detecting means as the braking condition detecting means is within this predetermined range. Namely, an abnormal state of the automatic braking condition can be detected more surely and readily. Since the determination can be made very quickly, no delay occurs in the determination.

In the middle stage of the automatic braking the automatic braking means may automatically brake the vehicle so that the deceleration in the longitudinal direction of the vehicle is retained at a constant target deceleration.

According to this apparatus, such a control as to retain the deceleration in the longitudinal direction of the vehicle at the constant target deceleration is carried out in the middle stage of the automatic braking.

When the deceleration in the longitudinal direction of the vehicle detected by the vehicle deceleration detecting means as the braking condition detecting means is compared with the target deceleration as a control target, the comparison can be carried out readily between the target deceleration and the deceleration in the longitudinal direction of the vehicle, because the target deceleration does not vary in the middle stage of the automatic braking. As a consequence, an abnormal state of the automatic braking condition can be detected surely and readily. By carrying out such a control as to retain the deceleration in the longitudinal direction of the vehicle at the constant target deceleration in the middle stage of the automatic braking as described above, the braking force can be raised in an early stage (namely, the deceleration increase gradient can be made steep) and after some braking force is obtained, this braking force can be retained. This can improve the braking response more.

The apparatus may comprise braking condition normal/abnormal determining means for determining whether the automatic braking condition is normal or abnormal, based on a result of detection by said braking condition detecting means, wherein when in the middle stage of the braking the deceleration detected by the braking condition detecting means departs from a predetermined range based on the target deceleration, the braking condition normal/abnormal determining means determines that the automatic braking condition is abnormal.

According to this apparatus, the predetermined range is determined based on the target deceleration of the constant value and whether the automatic braking condition is normal or abnormal in the middle stage of the automatic braking can be determined by simply determining whether the result of detection by the vehicle deceleration detecting means as the braking condition detecting means is within this predetermined range. Namely, an abnormal state of the automatic braking condition can be detected more surely and readily. Since the determination can be made very quickly, no delay is encountered in the determination.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A brake control apparatus for a vehicle comprising:
    a radar provided on the vehicle;
    a braking system for the vehicle;
    a sensor that detects a physical value from at least one of a fluid pressure of a wheel cylinder of the vehicle and a vehicle's longitudinal motion, said physical value being changeable as a result of action by said braking system; and
    an electronic control unit that automatically controls said braking system based on a signal from said radar, and that automatically controls said braking system so as to cause the physical value detected by said sensor to be a predetermined target physical value, the predetermined target physical value being variable during a braking period caused by the action of said braking system, the predetermined target physical value in an initial stage of the braking period increasing with time and the predetermined target physical value in a latter stage of the braking period decreasing with time, the predetermined target physical value providing an acceptable automatic braking range.

2. A brake control apparatus according to claim 1, wherein said sensor is a pressure sensor for detecting the brake fluid pressure in a wheel cylinder of the vehicle.

3. A brake control apparatus according to claim 1, wherein said sensor is a vehicle deceleration detection sensor for detecting a deceleration in the longitudinal motion of the vehicle.

4. A brake control apparatus, comprising:
    an object detecting means for detecting an object ahead of a vehicle;
    an automatic braking necessity determining means for determining whether automatic braking is necessary based on a result of detection by said object detecting means;
    an automatic braking means for automatically braking said vehicle by controlling a brake fluid pressure of a wheel cylinder of said vehicle based on a result of determination by said automatic braking necessity determining means; and
    a braking condition detecting means for detecting a condition of braking carried out by said automatic braking means, wherein said braking condition detecting means is a brake fluid pressure sensor for detecting the brake fluid pressure of the wheel cylinder, and wherein said automatic braking means compares the detected brake fluid pressure with a predetermined pressure increase or decrease gradient and automatically brakes said vehicle so that the brake fluid pressure of the wheel cylinder is increased according to the predetermined pressure increase gradient in an initial stage of said automatic braking and is decreased according to the predetermined pressure decrease gradient in a latter stage of said automatic braking.

5. The brake control apparatus according to claim 4, comprising braking condition normal/abnormal determining means for determining whether the automatic braking condition is normal or abnormal, based on a result of detection by said braking condition detecting means, wherein when in the initial stage of said automatic braking the brake fluid pressure of the wheel cylinder detected by said braking condition detecting means departs from a predetermined range based on said pressure increase gradient, said braking condition normal/abnormal determining means determines that the automatic braking condition is abnormal.

6. The brake control apparatus according to claim 4, comprising braking condition normal/abnormal determining means for determining whether the automatic braking condition is normal or abnormal, based on a result of detection by said braking condition detecting means, wherein when in the latter stage of said automatic braking the brake fluid pressure of the wheel cylinder detected by said braking condition detecting means departs from a predetermined range based on said pressure decrease gradient, said braking condition normal/abnormal determining means determines that the automatic braking condition is abnormal.

7. The brake control apparatus according to claim 4, wherein in a middle stage of said automatic braking said automatic braking means automatically brakes said vehicle so that the brake fluid pressure of the wheel cylinder is retained at a constant target brake fluid pressure.

8. The brake control apparatus according to claim 7, comprising braking condition normal/abnormal determining means for determining whether the automatic braking condition is normal or abnormal, based on a result of detection by said braking condition detecting means, wherein when in the middle stage of said braking the brake fluid pressure of the wheel cylinder detected by said braking condition detecting means departs from a predetermined range based on said target brake fluid pressure, said braking condition normal/abnormal determining means determines that the automatic braking condition is abnormal.

9. A brake control apparatus, comprising:
   object detecting means for detecting an object ahead of a vehicle;
   an automatic braking necessity determining means for determining whether automatic braking is necessary based on a result of detection by said object detecting means;
   an automatic braking means for automatically braking said vehicle by controlling a brake fluid pressure of a wheel cylinder of said vehicle based on a result of determination by said automatic braking necessity determining means; and
   a braking condition detecting means for detecting a condition of braking carried out by said automatic braking means,
   wherein said braking condition detecting means is vehicle deceleration detecting means for detecting a deceleration in the longitudinal direction of the vehicle, and wherein said automatic braking means compares the detected deceleration in the longitudinal direction with a predetermined deceleration increase or decrease gradient and automatically brakes said vehicle so that the deceleration in the longitudinal direction of the vehicle increases according to the predetermined deceleration increase gradient in an initial stage of said automatic braking and decreases according to the predetermined deceleration decrease gradient in latter stage of said automatic braking.

10. The brake control apparatus according to claim 9, comprising braking condition normal/abnormal determining means for determining whether the automatic braking condition is normal or abnormal, based on a result of detection by said braking condition detecting means, wherein when in the initial stage of said automatic braking the deceleration detected by said braking condition detecting means departs from a predetermined range based on said deceleration increase gradient, said braking condition normal/abnormal determining means determines that the automatic braking condition is abnormal.

11. The brake control apparatus according to claim 9, comprising braking condition normal/abnormal determining means for determining whether the automatic braking condition is normal or abnormal, based on a result of detection by said braking condition detecting means, wherein when in the latter stage of said automatic braking the deceleration detected by said braking condition detecting means departs from a predetermined range based on said deceleration decrease gradient, said braking condition normal/abnormal determining means determines that the automatic braking condition is abnormal.

12. The brake control apparatus according to claim 9, wherein in a middle stage of said automatic braking said automatic braking means automatically brakes said vehicle so that the deceleration in the longitudinal direction of the vehicle is retained at a constant target deceleration.

13. The brake control apparatus according to claim 12, comprising braking condition normal/abnormal determining means for determining whether the automatic braking condition is normal or abnormal, based on a result of detection by said braking condition detecting means, wherein when in the middle stage of said braking the deceleration detected by said braking condition detecting means departs from a predetermined range based on said target deceleration, said braking condition normal/abnormal determining means determines that the automatic braking condition is abnormal.

14. A brake control apparatus according to claim 1,
   wherein said braking system adjusts said fluid pressure under control of said electronic control unit, and
   wherein said braking system is not under said control of said electronic control unit when said physical value that is detected indicates an abnormal condition.

15. A brake control apparatus according to claim 14, wherein said detected physical value being out of a predetermined range indicates said abnormal condition.

* * * * *